United States Patent
Endo et al.

[11] Patent Number: 5,914,152
[45] Date of Patent: Jun. 22, 1999

[54] MAGNETIC RECORDING MEDIUM AND PROCESS FOR MAKING SAME

[75] Inventors: Daizo Endo; Masato Fukushima; Shin-ichi Ogawa, all of Ichihara, Japan

[73] Assignee: Showa Denko Kabushiki Kaisha, Tokyo, Japan

[21] Appl. No.: 08/966,026

[22] Filed: Nov. 7, 1997

Related U.S. Application Data

[62] Division of application No. 08/575,527, Dec. 20, 1995, Pat. No. 5,731,070.

[51] Int. Cl.$^6$ ............................................. G11B 5/85
[52] U.S. Cl. ........................ 427/128; 427/130; 427/131; 427/593; 204/192.15; 204/192.16; 204/192.23
[58] Field of Search ..................................... 427/128, 130, 427/131, 593; 204/192.15, 192.16, 192.23

[56] References Cited

U.S. PATENT DOCUMENTS

| | | | |
|---|---|---|---|
| 4,647,494 | 3/1987 | Meyerson et al. | 428/216 |
| 4,722,869 | 2/1988 | Honda et al. | 428/611 |

FOREIGN PATENT DOCUMENTS

| | | |
|---|---|---|
| 4247323 | 3/1992 | Japan . |
| 6349046 | 12/1994 | Japan . |
| 7073434 | 3/1995 | Japan . |
| 7073435 | 3/1995 | Japan . |

*Primary Examiner*—Stevan A. Resan
*Attorney, Agent, or Firm*—Sughrue, Mion, Zinn Macpeak & Seas, PLLC

[57] ABSTRACT

A magnetic recording medium comprised of (i) a non-magnetic substrate such as glass or carbon, (ii) a silicon layer preferably having a thickness of about 20–3,000 angstroms, formed on the substrate, (iii) a layer composed of at least one element of the platinum group of the periodic table or its alloy or carbon, formed on the silicon layer, wherein the platinum group element or alloy is at least partially silicified with silicon diffusing from the adjacent silicon layer, and the carbon is rendered at least partially amorphous with silicon diffusing from the adjacent silicon layer, (iv) an undercoat composed of chromium or its alloy, formed on the layer of a platinum group element or alloy or carbon, (v) a magnetic layer composed of a cobalt alloy, formed on the undercoat, (vi) a protective carbon overcoat formed on the magnetic layer, and (vii) an optional lubricating layer formed on the protective overcoat.

16 Claims, 1 Drawing Sheet

MAGNETIC RECORDING MEDIUM AND PROCESS FOR MAKING SAME

This is a divisional of application Ser. No. 08/575,527 filed Dec. 20, 1995 now U.S. Pat. No. 5,731,070.

BACKGROUND OF THE INVENTION (1) Field of the Invention

This invention relates to a magnetic recording medium having a multi-layer film coating formed thereon and a process for making the same. More particularly, the present invention relates to a magnetic recording medium having a multi-layer structure capable of exhibiting an optimum recording density, and a process for making the magnetic recording medium.

(2) Description of the Related Art

Conventional magnetic recording disk mediums have a multi-layer structure composed of an undercoat, a magnetic layer, and a protective overcoat, which are in turn formed on a non-magnetic substrate by sputtering or other means. Further, a lubricating layer is formed as the outermost surface layer.

As the magnetic layer, cobalt alloys have been heretofore proposed which comprise cobalt as the primary ingredient and two or more metals selected from platinum, niobium, tantalum, chromium, nickel and other metals, and which are formed by sputtering using a target composed of the cobalt alloys (see, for example, Japanese Unexamined Patent Publication No. 61-292219, ibid. 62-239420 and ibid. 62-137720).

As the undercoat, chromium or chromium alloys such as a chromium nickel alloy are predominantly used (see, for example, Japanese Unexamined Patent Publication No. 62-257618, ibid. 63-106917 and ibid. 61-292219).

As the non-magnetic substrate, aluminum alloys such as aluminum-magnesium (AlMg) alloy, with a nickel-phosphorus NiP) surface coating, are predominantly used. In recent years, there is an increasing demand for a glass substrate and a carbon substrate instead of aluminum alloys because the surface of glass exhibits a good mar resistance and can be easily mirror-polished.

However, it is possible that part of the elements present on the surface of a glass substrate or a carbon substrate diffuses into an undercoat layer composed of chromium or a chromium alloy, and water vapor or hydrogen contained in micropores or grain boundaries within a glass substrate or carbon substrate is emitted, and further oxygen ions diffuse within a glass substrate. These phenomena tend to lead to recduction in the coercive force Hc and coercivity squareness ratio S* of the magnetic layer, and thus, the enhancement of magnetic recording density are hindered.

Therefore, a magnetic recording medium exhibiting enhanced coercive force Hc and coercivity squareness ratio S* in the coercive force-hysteresis curve is desired to enhance the magnetic recording density. This is especially true for a magnetic recording medium having a glass substrate or a carbon substrate.

It has been proposed in Japanese Unexamined Patent Publication No. 4-247323 that a titanium layer and a silicon layer are formed in this order on a non-magnetic substrate, and the thus-superposed layers are heated, followed by formation an undercoat, a magnetic layer, and a protective layer, whereby the magnetic characteristics are improved. However, it is possible that silicon tends to be present in excess on the surface portion of the superposed two layers, which reacts partially with chromium and exerts a harmful influence upon the stable orientation of chromium in the undercoat formed on the two layers.

SUMMARY OF THE INVENTION

In view of the foregoing, a primary object of the present invention is to provide a magnetic recording medium having a high coercive force and a high coercivity squareness ratio, and thus, exhibiting an improved magnetic recording density.

Another object of the present invention is to provide a process by which a magnetic recording medium exhibiting an improved magnetic recording density is made.

In one aspect of the present invention, there is provided a magnetic recording medium comprising:

a non-magnetic substrate, a silicon layer formed on the substrate, a layer composed of (i) at least one member selected from the group consisting of elements of the platinum group of the periodic table and alloys thereof, or (ii) carbon, formed on the silicon layer; said member selected from elements of the platinum group and alloys thereof being at least partially silicified with silicon diffusing from the adjacent silicon layer, and said carbon being rendered at least partially amorphous with silicon diffusing from the adjacent silicon layer, an undercoat formed on the platinum group element or alloy or carbon layer, a magnetic layer formed on the undercoat, a protective overcoat formed on the magnetic layer, and an optional lubricating layer formed on the protective overcoat.

In another object of the present invention, there is provided a process for making a magnetic recording medium which comprises the steps of:

forming a silicon layer on a non-magnetic substrate;

forming a layer composed of (i) at least one member selected from the group consisting of elements of the platinum group of the periodic table and alloys thereof, or (ii) carbon, on the silicon layer;

forming an undercoat on the platinum group element or alloy or carbon layer;

forming a magnetic layer on the undercoat;

forming a protective overcoat on the magnetic layer; and then, preferably, further forming a lubricating layer on the protective overcoat;

wherein said member selected from elements of the platinum group and alloys thereof is at least partially silicified with silicon diffusing from the adjacent silicon layer, and said carbon is rendered at least partially amorphous with silicon diffusing from the adjacent silicon layer.

DESCRIPTION OF THE PREFERRED EMBODIMENTS

Figure 1:
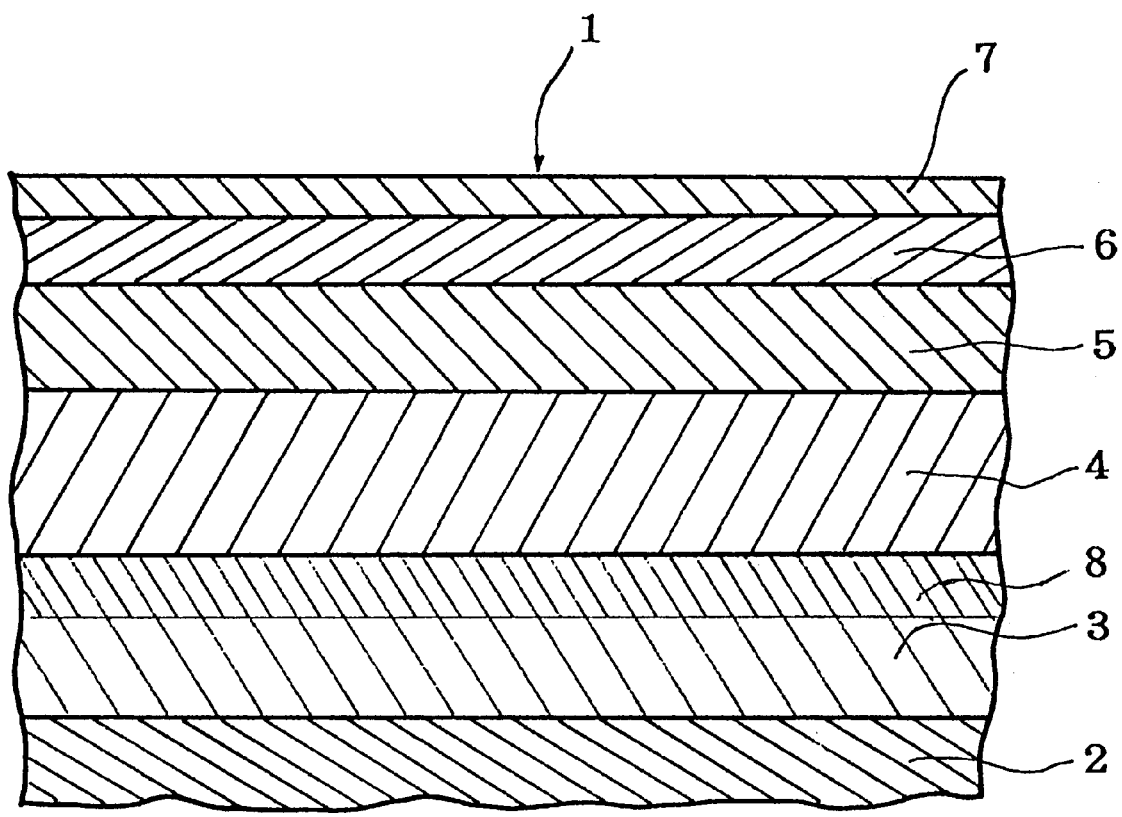
FIG. 1 is a schematic drawing of a sectional view of a magnetic recording medium of the present invention.

As illustrated in the schematic drawing shown in FIG. 1, the magnetic recording medium 1 of the present invention is characterized in that a silicon layer 3 and a layer 8 composed of (i) at least one member selected from elements of the platinum group of the periodic table and alloys thereof, or (ii) carbon are formed between a non-magnetic substrate 2 and an undercoat 4 of a multi-layer magnetic recording medium 1 comprising the non-magnetic substrate 2, the undercoat 4, a magnetic layer 5, a protective overcoat 6 and an optional lubricating layer 7. The member selected from elements of the platinum group and alloys thereof is at least partially silicified with silicon diffusing from the adjacent silicon layer 3, and said carbon is rendered at least partially amorphous with silicon diffusing from the adjacent silicon layer 3, whereby the coercive force and the coercivity squareness ratio of the magnetic recording medium 1 are greatly enhanced.

The non-magnetic substrate used is not particularly limited, and substrates made of conventional materials may be used, which include, for example, glass, carbon and aluminum alloys such as an aluminum-magnesium alloy. Of these materials, glass is preferable because the surface of glass exhibits a good mar resistance and a mirror-polished surface can easily be obtained. As examples of available glass, there can be mentioned crystallized glass, and chemically strengthened glass such as soda-lime glass and aluminosilicate glass. Carbon also is preferable.

The silicon layer is formed on the mirror-polished glass surface. The thickness of the silicon layer is usually in the range of about 20 to about 3,000 angstroms, preferably from about 30 to about 2,000 angstroms, and more preferably about 50 to about 1,500 angstroms. With a thickness smaller than about 20 angstroms, the adhesion is reduced and the function of adsorbing oxygen ions and other ingredients diffusing from the non-magnetic substrate is deteriorated, with the results that the enhancement of coercive force and coercivity squareness ratio is hindered. Even with a thickness exceeding about 3,000 angstroms, the increase of the coercive force and coercivity squareness ratio becomes very minor.

The silicon layer can be made from silicon, but silicon doped with at least one element selected from groups III and V of the periodic table, such as phosphorus or boron, can be used. The doped silicon has a good electrical conductivity and thus is suitable for direct current (DC) sputtering for forming the silicon layer. The amount of the dopant is preferably such that the specific resistance of the silicon target is reduced to 0.1 to 0.01 ohm.cm, and is usually approximately 0.1% by weight.

The silicon layer is formed by sputtering, chemical vapor deposition (CVD) or other means. Of these, sputtering is preferable. The sputtering of silicon is effected in an inert gas atmosphere such as argon at a reduced pressure of 1 to 20 m-Torr, preferably 3 to 10 m-Torr, usually by a radio frequency (RF) sputtering or direct current (DC) sputtering method. The power input and sputtering time are adjusted so that a silicon coating having the intended thickness is formed.

On the silicon layer, a layer composed of at least one member selected from elements of the platinum group of the periodic table or an alloy thereof, or a carbon layer is formed. As examples of the elements of the platinum group, there can be mentioned platinum, palladium, rhodium, ruthenium, iridium and osmium.

The layer of an element of the platinum group of the periodic table or an alloy thereof, and the carbon layer are preferbly formed by sputtering. The sputtering is effected in an inert gas atmosphere such as argon at a reduced pressure of 1 to 20 m-Torr, preferably 3 to 10 m-Torr, usually by a radio frequency (RF) sputtering or direct current (DC) sputtering method.

The layer composed of a platinum group-element or its alloy or carbon must have an amorphous surface and prevent gas or other ingredients from diffusing into the undercoat to be formed thereon. For these requirements, the platinum group element or alloy or carbon is silicified and rendered amorphous with silicon diffusing from the adjacent silicon layer. The diffusion of silicon in the layer of a platinum group element or alloy or carbon is effected either at room temperature or at an elevated temperature up to about 600° C., preferably in the range of 200° C. to 400° C.

The heating of the silicon layer for promoting the diffusion of silicon is carried out (i) prior to the formation of the layer of a platinum group-element or alloy or carbon, (ii) by utilizing a heat generated when a sputtering is conducted for the formation of the layer of a platinum group-element or alloy or carbon, or (iii) by utilizing a heat generated when a sputtering is conducted for the formation of the undercoat. Preferably, the silicon layer is pre-heated immediately before the formation of the layer of a platinum group-element or alloy or carbon.

The rate of silicification or becoming amorphous varies depending upon the particular heating temperature and the composition of the layer to be silicified, but is usually about 100 to about 200 angstroms/minute at a sputtering temperature of 300 to 500° C. The thickness of the layer of a platinum group element or alloy or carbon is preferably such that silicon diffuses over the entire thickness of the layer before or upon the formation of the undercoat. Usually the thickness of the layer of a platinum group element or alloy is in the range of about 50 to about 1,000 angstroms, and the thickness of the carbon layer is about 10 to about 300 angstroms.

By the formation of the silicified platinum group element or alloy layer or the amorphous carbon layer, the dependency of coercivity squareness ratio upon temperature is desirably reduced and the coercivity squareness ratio is improved.

An undercoat is formed on the silicified platinum group element or alloy layer or the amorphous carbon layer. The undercoat is usually formed from chromium or chromium alloys composed of at least 70 atomic % of chromium. Preferable chromium alloys comprise not larger than 30 atomic % of at least one metal selected from titanium, molybdenum, tantalum and vanadium. The undercoat preferably has a thickness of about 100 to about 2,000 angstroms.

The undercoat is usually formed by direct current sputtering or radio frequency sputtering. The sputtering is effected in an inert gas atmosphere such as argon at a reduced pressure of 1 to 20 m-Torr, preferably 3 to 10 m-Torr.

The sputtering is preferably effected while the silicon layer and the silicified platinum group element or alloy layer or the amorphous carbon layer are maintained at a temperature in the range of room temperature to about 600° C., more preferably 200 to 500° C. By maintaining these layers at a temperature higher than room temperature during the sputter-deposition of the chromium-containing undercoat, a magnetic recording medium exhibiting enhanced coercive force and coercivity squareness ratio can be stably obtained.

On the undercoat, a magnetic layer is formed usually from cobalt alloys. The cobalt alloys used are not particularly limited, and can be selected from those conventionally used as magnetic materials for magnetic recording mediums. As specific examples of the cobalt alloys, there can be mentioned CoCrTa, CoNi, CoCrNi, CoCrPt, CoNiPt, CoNiPtCr and CoCrPtTa. The magnetic layer is usually formed by direct current sputtering or radio frequency sputtering, conducted in an inert gas atmosphere such as argon at a reduced pressure of 1 to 20 m-Torr, preferably 3 to 10 m-Torr. The thickness of the magnetic layer is preferably in the range of about 100 to about 1,000 angstroms.

An protective overcoat is formed from carbon on the magnetic layer by direct current sputtering or radio frequency sputtering. Preferably direct current sputtering is conducted. The sputtering is effected in an inert gas atmosphere such as argon at a reduced pressure of 1 to 20 m-Torr, preferably 3 to 10 m-Torr. During sputtering, nitrogen gas or hydrogen gas can be incorporated in the inert gas atmosphere to effect a reactive sputtering whereby a protective coating of carbon having incorporated therein nitrogen or hydrogen is formed. The thickness of the protective carbon overcoat is usually in the range of about 50 to 300 angstroms, preferably about 150 to about 200 angstroms.

Preferably, a lubricating top layer is formed on the protective overcat. The lubricating layer can be made of a fluorinated resin lubricant by a coating method such as a spin coating method.

The invention will now be specifically described by the following examples that by no means limit the scope of the invention.

In the examples, bit-shift was measured by using a thin film head having a gap length of 0.35 $\mu$m and a track width of 6.9 mm at a flying height of 2.5 micro-inch and a radius of 20.0 mm. The evaluation of bit-shift was conducted according to an M.F.M. as the modulation code and a $B_6D_9$ pattern as the recorded pattern. The coercive force (Hc), coercivity squareness ratio (S*) and the product (Br$\delta$) of residual magnetization (Br) with thickness ($\delta$) of the magnetic layer were measured on square samples having a size of 7 mm×7 mm by using a vibration sample magnetometer (supplied by Rigaku Denki K.K.).

Examples 1 and 2, Comparative Examples 1 and 2

On a non-magnetic substrate composed of chemically strengthened glass (soda-lime glass supplied by Pilkingstone) in Example 1, or carbon (supplied by Kobe Steel Ltd.) in Example 2, a silicon layer having a thickness of about 400 angstroms was formed by radio frequency sputtering. Using pure silicon as the target, the radio frequency sputtering was conducted in an argon atmosphere at a reduced pressure of 3 m-Torr.

The thus-formed silicon layer was pre-heated to 300° C., and a platinum layer having a thickness of about 100 angstroms was formed by direct current sputtering on the silicon layer maintained at that temeprature. The sputtering was conducted in an argon atmosphere at a reduced pressure of 3 m-Torr.

Then a chromium undercoat was formed by direct current sputtering on the silicon layer. Namely, using a chromium target the direct current sputtering was conducted in an argon atmosphere at a temperature of 300° C. and a reduced pressure of 3 m-Torr to form a chromium coating having a thickness of about 1,000 angstroms. Then a magnetic layer was formed by direct current sputtering. Namely, using a $Co_{75}Cr_{13}Pt_{12}$ (the numerals signify atomic %) alloy, the direct current sputtering was conducted in an argon atmosphere at a reduced pressure of 3 m-Torr to form a coating of the CoCrPt alloy having a thickness of about 450 angstroms.

On the thus-formed magnetic layer, a protective overcoat was formed from carbon by direct current sputtering. Namely, using a carbon target, the direct current sputtering was conducted in an argon atmosphere at a reduced pressure of 3 m-Torr to form a carbon coating having a thickness of 250 angstroms. Then a lubricant layer having a thickness of 30 angstroms was formed from a perfluoro-polyether resin by a spin coating method whereby a magnetic recording medium was made.

For comparison, the above-mentioned procedures were repeated to make magnetic recording mediums wherein the silicon layer and the platinum layer were not formed and thus the undercoat was directly formed on the glass or carbon substrate in Comparative Examples 1 and 2.

The composition and thickness of each film layer, and the film-forming temperature are shown in Table 1.

TABLE 1

| Constitution of each layer | | Thickness (angstroms) | Layer-forming temperature (° C.) |
|---|---|---|---|
| Protective layer | Carbon | 250 | — |
| Magnetic layer | $Co_{75}Cr_{13}Pt$ | 450 | — |
| Undercoat | Chromium | 1,000 | 300 |
| Silicified layer | Platinum | 100 | 300 |
| Silicon layer | | 400 | 30 |
| Non-magnetic substrate | Glass or carbon | — | — |

The coercivity (Hc), product (Br$\delta$) of residual magnetization (Br)×thickness ($\delta$) of magnetic layer, coercivity squareness ratio (S*), and bit-shift of the thus-obtained magnetic recording medium were evaluated. The results are shown in Table 2.

As seen from Table 2, the magnetic recording medium of the present invention having intermediate silicon layer and silicified platinum layer exhibits an enhanced coercivity squareness ratio S* and a reduced bit-shift, as compared with those of the conventional magnetic recording medium having no intermediate silicon layer and silicified platinum layer.

TABLE 2

| | Substrate | Si-layer Pt-layer | Coercivity (Hc) (Oe) | Br$\delta$ (G · $\mu$m) | Coercivity squareness ratio S*(%) | Bit-shift (ns) |
|---|---|---|---|---|---|---|
| Example 1 | Glass | Formed | 1,990 | 310 | 92 | 7.2 |
| Com. Ex. 1 | Glass | Not formed | 1,980 | 310 | 81 | 13.2 |
| Example 2 | Carbon | Formed | 2,000 | 310 | 91 | 7.5 |
| Com. Ex. 2 | Carbon | Not formed | 2,000 | 310 | 83 | 12.1 |

Examples 3 to 6

By the same procedures as described in Example 1, magnetic recording mediums were made except that the thickness of the silicon layer was changed to 1,000 angstroms and the thickness of the silicified platinum layer was changed as shown in Table 3. All other conditions remained substantially the same. The magnetic properties of the magnetic recording mediums were evaluated. The results are shown in Table 3.

TABLE 3

|  | Thickness of Pt layer (angstroms) | Coercivity (HC) (Oe) | Brδ (G · μm) | Coercivity squareness ratio S*(%) | Bit-shift (ns) |
|---|---|---|---|---|---|
| Example 3 | 20 | 1,990 | 310 | 86 | 10.4 |
| Example 4 | 100 | 1,980 | 310 | 91 | 7.3 |
| Example 5 | 500 | 1,990 | 310 | 90 | 7.4 |
| Example 6 | 1,000 | 2,000 | 310 | 91 | 7.3 |

As seen from Table 3, when the thickness of the platinum layer is 20 angstroms, the coercivity squareness ratio is somewhat small and the bit-shift is large. In contrast, when the thickness of the platinum layer exceeds about 50 angstroms, the coercivity squareness ratio is large and the bit-shift is small.

Examples 7 and 8

By the same procedures as described in Examples 1 and 2, magnetic recording mediums were made except that a palladium layer having a thickness of 100 angstroms was formed instead of the platinum layer. All other conditions remained substantially the same. The magnetic properties of the magnetic recording mediums were evaluated. The results are shown in Table 4.

TABLE 4

|  | Sub-strate | Si-layer Pd-layer | Coercivity (Hc) (Oe) | Brδ (G · μm) | Coercivity squareness ratio S*(%) | Bit-shift (ns) |
|---|---|---|---|---|---|---|
| Example 7 | Glass | Formed | 1,970 | 310 | 92 | 7.4 |
| Com. Ex. 1 | Glass | Not formed | 1,980 | 310 | 81 | 13.2 |
| Example 8 | Carbon | Formed | 2,010 | 310 | 93 | 7.3 |
| Com. Ex. 2 | Carbon | Not formed | 2,000 | 310 | 83 | 12.1 |

As seen from Table 4, the magnetic recording medium of the present invention having intermediate silicon layer and silicified palladium layer (Examples 7, 8) exhibits an enhanced coercivity squareness ratio S* and a reduced bit-shift, which are silmilar to those of the magnetic recording medium having intermediate silicon layer and silicified palladium layer (Examples 1, 2).

Examples 7 to 12

By the same procedures as described in Examples 1, magnetic recording mediums were made except that a rhodium, iridium, ruthenium or osmimium layer having a thickness of 100 angstroms was formed instead of the platinum layer. All other conditions remained substantially the same. The magnetic properties of the magnetic recording mediums were evaluated. The results are shown in Table 5.

As seen from Table 5, the magnetic recording medium of the present invention having intermediate silicon layer and a silicified rhodium, iridium, ruthenium or osmimium palladium layer (Examples 9 to 12) exhibits an enhanced coercivity squareness ratio S* and a reduced bit-shift, which are silmilar to those of the magnetic recording medium having intermediate silicon layer and silicified palladium layer (Example 1).

TABLE 5

|  | Layer of Pt group element & thickness (Å) | Coercivity (Hc) (Oe) | Brδ (G · μm) | Coercivity squareness ratio S*(%) | Bit-shift (ns) |
|---|---|---|---|---|---|
| Example 9 | Rh 100 | 2,010 | 310 | 93 | 7.2 |
| Example 10 | Ir 100 | 2,000 | 310 | 91 | 7.5 |
| Example 11 | Ru 100 | 2,000 | 310 | 92 | 7.3 |
| Example 12 | Os 100 | 2,010 | 310 | 90 | 7.8 |

Examples 13 and 14

By the same procedures as described in Examples 1 and 2, magnetic recording mediums were made except that the thickness of the silicon layer was changed to 500 angstroms and a carbon layer having a thickness of 200 angstroms was formed instead of the platinum layer having a thickness of 100 angstroms. All other conditions remained substantially the same. The magnetic properties of the magnetic recording mediums were evaluated. The results are shown in Table 6.

TABLE 6

|  | Sub-strate | Si-layer C-layer | Coercivity (Hc) (Oe) | Brδ (G · μm) | Coercivity squareness ratio S*(%) | Bit-shift (ns) |
|---|---|---|---|---|---|---|
| Example 13 | Glass | Formed | 2,000 | 310 | 93 | 7.5 |
| Com. Ex. 1 | Glass | Not formed | 1,980 | 310 | 81 | 13.2 |
| Example 14 | Carbon | Formed | 2,010 | 310 | 92 | 7.8 |
| Com. Ex. 2 | Carbon | Not formed | 2,000 | 310 | 83 | 12.1 |

As seen from Table 6, the magnetic recording medium of the present invention having intermediate silicon layer and amorphous carbon layer (Examples 13, 14) exhibits an enhanced coercivity squareness ratio S* and a reduced bit-shift, which are silmilar to those of the magnetic recording medium having intermediate silicon layer and silicified palladium layer (Examples 1, 2).

Examples 15 and 16, and Comparative Examples 3 and 4

By the same procedures as described in Examples 13 and 14, and Comparative Examples 1 and 2, magnetic recording mediums were made except that a magnetic layer composed of $Co_{81}Cr_{13}Pt_6$ (numerals signify atomic %) having a thickness of 450 angstroms was formed instead of the $Co_{75}Cr_{13}Pt_{12}$ layer having a thickness of 450 angstroms. All other conditions remained substantially the same. The magnetic properties of the magnetic recording mediums were evaluated. The results are shown in Table 7.

TABLE 7

|  | Sub-strate | Si-layer C-layer | Coercivity (Hc) (Oe) | Brδ (G · μm) | Coercivity squareness ratio S*(%) | Bit-shift (ns) |
|---|---|---|---|---|---|---|
| Example 15 | Glass | Formed | 1,700 | 320 | 91 | 8.0 |
| Com. Ex. 3 | Glass | Not formed | 1,710 | 320 | 80 | 12.9 |
| Example 16 | Carbon | Formed | 1,690 | 310 | 92 | 8.1 |
| Com. Ex. 4 | Carbon | Not formed | 1,680 | 310 | 73 | 13.5 |

As seen from Table 7, the magnetic recording medium of the present invention having intermediate silicon layer and amorphous carbon layer (Examples 15, 16) exhibits an enhanced coercivity squareness ratio S* and a reduced bit-shift, as compared with those of the conventional magnetic recording medium having no intermediate silicon layer and amorphous carbon layer (Comparative Examples 3, 4).

What is claimed is:

1. A process for making a magnetic recording medium which comprises the steps of:

forming a silicon layer on a non-magnetic substrate;

forming a layer composed of (i) at least one member selected from the group consisting of elements of the platinum group of the periodic table and alloys thereof, or (ii) carbon, on the silicon layer;

forming an undercoat on the platinum group element or alloy or carbon layer;

forming a magnetic layer on the undercoat; and then forming a protective overcoat on the magnetic layer;

wherein said member selected from elements of the platinum group and alloys thereof is at least partially silicified with silicon diffusing from the adjacent silicon layer, and said carbon is rendered at least partially amorphous with silicon diffusing from the adjacent silicon layer.

2. The process for making a magnetic recording medium according to claim 1, wherein the non-magnetic substrate is made of glass or carbon.

3. The process for making a magnetic recording medium according to claim 1, wherein the silicon layer is formed to a thickness of about 20 to about 3,000 angstroms.

4. The process for making a magnetic recording medium according to claim 1, wherein the silicon layer is formed to a thickness of about 30 to about 2,000 angstroms.

5. The process for making a magnetic recording medium according to claim 1, wherein the silicon layer is formed by direct current sputtering using, as the target, silicon doped with an element selected from groups III and V of the periodic table in an amount such that the specific resistance of the silicon layer to 0.1 to 0.01 ohm.cm.

6. The process for making a magnetic recording medium according to claim 1, wherein the silicon layer is formed by radio frequency sputtering using pure silicon as the target.

7. The process for making a magnetic recording medium according to claim 1, wherein the layer of a platinum group element or its alloy is formed to a thickness of about 50 to about 1,000 angstroms.

8. The process for making a magnetic recording medium according to claim 1, wherein the platinum group element is selected from the group consisting of platinum, palladium, rhodium, ruthenium, iridium and osmium.

9. The process for making a magnetic recording medium according to claim 1, wherein the layer of carbon is formed to a thickness of about 10 to about 300 angstroms.

10. The process for making a magnetic recording medium according to claim 1, wherein the layer of a platinum group element or its alloy or carbon is formed by direct current sputtering or radio frequency sputtering.

11. The process for making a magnetic recording medium according to claim 1, wherein the diffusion of silicon from the silicon layer to the layer of a platinum group element or its alloy or carbon is effected either at room temperature or at an elevated temperature up to about 600° C.

12. The process for making a magnetic recording medium according to claim 1, wherein the diffusion of silicon from the silicon layer to the layer of a platinum group element or its alloy or carbon is effected by pre-heating the silicon layer at a temperature of 200 to 400° C., followed by the formation of the layer of a platinum group element or its alloy or carbon.

13. The process for making a magnetic recording medium according to claim 1, wherein the undercoat is formed from chromium or a chromium alloy comprising at least 70 atomic % of chromium.

14. The process, for making a magnetic recording medium according to claim 13, wherein the chromium alloy is composed of at least 70 atomic % of chromium and not larger than 30 atomic % of at least one metal selected from the group consisting of titanium, molybdenum, tantalum and vanadium.

15. The process for making a magnetic recording medium according to claim 1, which further comprises the step of forming a lubricating layer on the protective overcoat.

16. The process for making a magnetic recording medium according to claim 1, wherein the protective overcoat is formed from carbon.

* * * * *